(12) United States Patent
Kuckes

(10) Patent No.: US 8,322,462 B2
(45) Date of Patent: Dec. 4, 2012

(54) PROXIMITY DETECTION SYSTEM FOR DEEP WELLS

(75) Inventor: Arthur F. Kuckes, Ithaca, NY (US)

(73) Assignee: Halliburton Energy Services, Inc., Houston, TX (US)

( * ) Notice: Subject to any disclaimer, the term of this patent is extended or adjusted under 35 U.S.C. 154(b) by 223 days.

(21) Appl. No.: 12/642,622

(22) Filed: Dec. 18, 2009

(65) Prior Publication Data

US 2010/0155139 A1 Jun. 24, 2010

Related U.S. Application Data

(63) Continuation-in-part of application No. 12/342,034, filed on Dec. 22, 2008, now Pat. No. 8,113,298.

(51) Int. Cl.
*E21B 47/01* (2012.01)
*E21B 47/12* (2012.01)
(52) U.S. Cl. ............................................ 175/45; 175/41
(58) Field of Classification Search .................... 175/24, 175/41, 45, 61, 315
See application file for complete search history.

(56) References Cited

U.S. PATENT DOCUMENTS

| 4,072,200 | A | * | 2/1978 | Morris et al. ................... 175/45 |
| 4,361,192 | A | | 11/1982 | Trowsdale |
| 5,064,006 | A | * | 11/1991 | Waters et al. ................... 175/45 |
| 5,883,516 | A | * | 3/1999 | Van Steenwyk et al. ..... 324/366 |
| 2008/0159077 | A1 | * | 7/2008 | Madhavan et al. ............. 367/76 |

* cited by examiner

*Primary Examiner* — Brad Harcourt
(74) *Attorney, Agent, or Firm* — Baker Botts L.L.P.

(57) ABSTRACT

A method and apparatus for magnetic field measurements to determine the proximity of a nearby target incorporating electrically conductive material includes a drill string (54) having multiple drill pipe sections (56, 57, 58, 59) connected end-to-end, with at least one of the drill pipe sections (57) being electrically conductive and isolated to provide an electrode section. A nonmagnetic drill pipe section (84) is connected in the drill string below the electrode section (57), and a hydraulic motor (62) having a rotatable drill bit sub (70) carrying a magnetic field sensing instrument package (102) is connected to a lowermost end of the drill string. A power supply provides a time-varying current to the drill pipe electrode section (57) to produce a corresponding target current magnetic field to be detected at the drill bit instrument (10)2, and a communication instrument package (94) is locatable within the nonmagnetic drill pipe section (84) to receive magnetic field data from the magnetic field sensing instrument package (102) on the drill bit (70).

22 Claims, 10 Drawing Sheets

Drill Bit Instrumentation sub

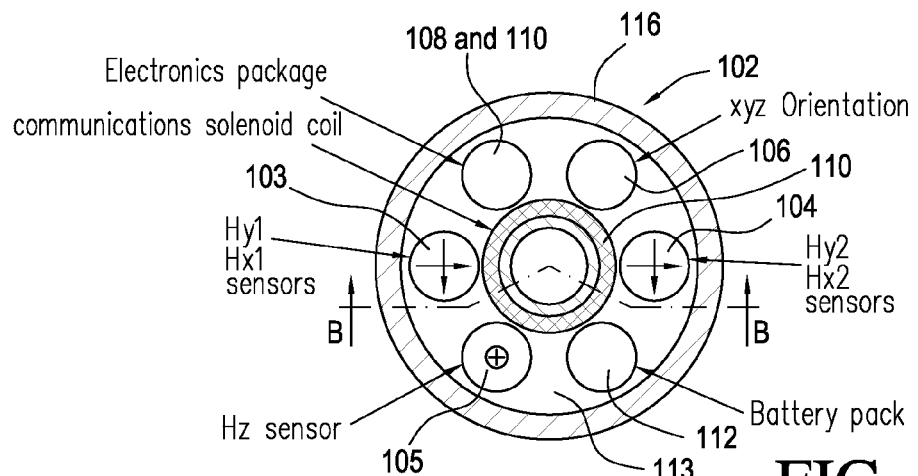
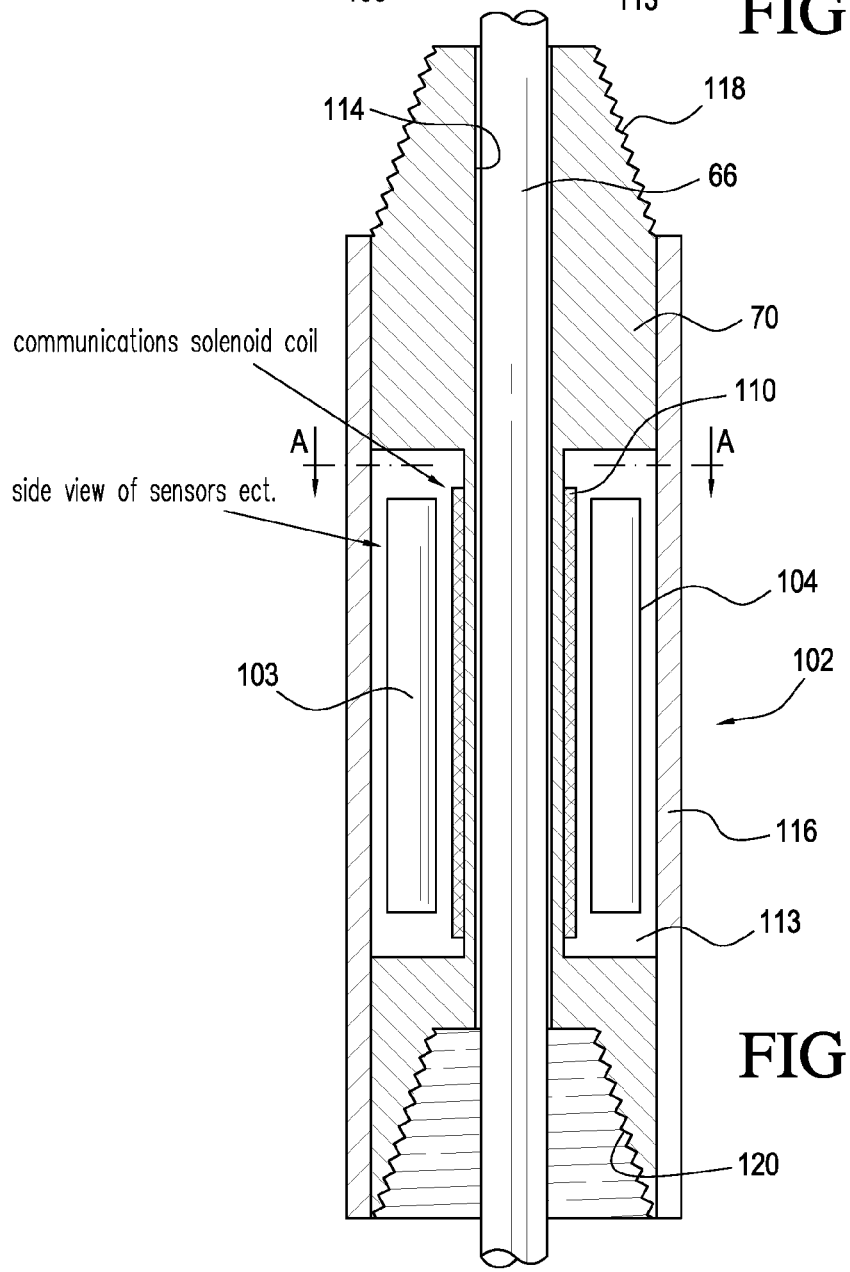

Instrumentation package on wireline

PROXIMITY DETECTION SYSTEM FOR DEEP WELLS

CROSS REFERENCE TO RELATED APPLICATIONS

This application is a Continuation-in-Part of U.S. application Ser. No. 12/342,034, filed Dec. 22, 2008, now U.S. Pat. No. 8,113,298 and entitled "Wireline Communication System for Deep Wells", the entire disclosure of which is hereby incorporated herein by reference.

FIELD OF THE INVENTION

The present invention relates, in general, to methods and apparatus for locating a nearby conductive target, such as a cased well or borehole, from a remote location such as a second borehole or deep well to obtain data for use in guiding the direction of drilling the second well with respect to the target. More particularly, the invention is directed to methods and apparatus for injecting time-varying electrical currents into the earth from one or more electrodes in a borehole being drilled, for detecting at the drill bit of that borehole the electromagnetic field vectors resulting from the portion of such injected currents which flows in metal at the target, and for transmitting data representing the detected fields to the earth's surface for use in determining the proximity of the target.

BACKGROUND OF THE INVENTION

It is well known that in drilling boreholes in the earth, such as deep wells for oil and gas exploration, precise control of the path followed by the well is extremely difficult, so that it is virtually impossible to know the exact location of the well at a given depth. For example, a drilling tolerance of plus or minus one quarter of a degree will allow the bottom of a 10,000-foot well to be positioned anywhere within a circle 100 feet in diameter, and numerous other factors can increase the deviation. This is not of particular concern in many drilling operations, but if drilling precision is necessary, as where a borehole is to be drilled precisely to intersect a target location, is to be drilled so as to avoid an existing well, or is to be drilled to be parallel to an existing borehole, such variations can cause severe difficulties. One example of the need for precision drilling occurs in the situation where it becomes necessary to drill a relief well to intersect an existing deep well, as in the case where the casing of the deep well has ruptured and it becomes necessary to plug the well at or below the point of the rupture to bring it under control. In order to do this, the relief well must be drilled to intersect the original well at the desired level, and since such ruptures, or blowouts, often produce extremely hazardous conditions at the surface in the vicinity of the original well, the relief well usually must be started a considerable distance away from the original wellhead and drilled at an incline down to the desired point of intersection.

Because the same problems of control of the direction of drilling that were encountered in the original well are also encountered in drilling the relief well, the location of the relief well borehole also cannot always be known with precision as the relief well is being drilled; accordingly, it is extremely difficult to determine the distance and direction from the end of the relief well to the desired point of intersection on the target well. In addition, the relief well usually is very complex, compounding the problem of knowing exactly where it is located with respect to a target that may be 10 inches in diameter at a distance of thousands of feet below the earth's surface.

Numerous early attempts were made to solve the problem of guiding a relief well to accurately intersect a target well. Some utilized surveying techniques to locate the relief well with respect to a target well, but such survey techniques are not capable of providing accurate data concerning the relationship of the relief well to the original well until the relief well has approached very near the original well. Magnetic gradient ranging equipment can be used with considerable accuracy at close range; however, it has been found that outside a radius of a few tens of feet, such systems are usually inadequate.

In an attempt to extend the distance at which accurate information can be obtained, a variety of electrical well logging techniques have been used which treat the target well as an anomaly in the geologic structure of the earth surrounding the relief well. Some of these systems are directed to the measurement of the apparent resistivity of the earth across a pair of electrodes but, since no directionality is given by this method, it is ineffective for directing a relief well with respect to an existing well.

In addition, there have been attempts to obtain similar data through the use of electromagnetic prospecting, where induction sensing coils mounted at right angles to each other are used in conjunction with other conventional well logging systems to determine the probable location of a target. However, such systems do not suggest the possibility of locating relatively small targets such as well bores.

Other systems have been developed for directing a second well with respect to a first well by the use of sonic detectors responsive to the sound produced by fluids flowing out of a ruptured well formation. However, such systems do not operate when there is no sound emanating from the target well, and, in addition, do not provide the required degree of directional and distance accuracy. Another system uses a signal transmitter in one well and a signal receiver in the other well, wherein sound waves or magnetic fields may be used as the signals. In such a system, however, the target well must be accessible so that the signal source can be placed in one well and the receiver in the other, and is not effective where the target well is not open.

Many of the difficulties outlined above were overcome in the prior art by methods and apparatus disclosed, for example, in U.S. Pat. Nos. 4,323,848, 4,372,398, 4,700,142, and 5,512,830, all issued to Arthur F. Kuckes, the applicant herein. In accordance with these patents, an electric current flow is produced in a target such as the casing of a target well by injecting a low frequency alternating current into the earth surrounding the target well through the use of an electrode located in a relief well, or borehole. This current flow extends between the downhole electrode and a second electrode that may be located at the earth's surface in the vicinity of the head of the relief well. A portion of the injected earth current finds a path of least resistance through the casing or other current-conducting material in the target borehole, and the resulting concentration of current produces a characteristic magnetic field surrounding the target well which can be detected by an AC magnetic field sensor such as that described in U.S. Pat. No. 4,323,848, or by multiple sensors, as described in U.S. Pat. No. 5,512,830. These sensors are extremely sensitive to very small magnetic fields, and accurately detect the vectors of magnetic fields produced by currents flowing in well casings located a considerable distance away from the relief borehole.

The vector signals obtained from the AC magnetic field sensors, in accordance with the aforesaid patents, permit calculation of the direction and distance to the target well casing with respect to the location of the AC magnetic field sensor in the relief well. This information can be used to guide further drilling of the relief well. Thus, as the relief well approaches a desired depth, its approach to the location of the target well can be guided so that the target well is intersected at the desired depth below the earth's surface in a rapid and effective manner. This method of guiding a relief well to intersect with a target is a homing-in process, wherein multiple measurements—often after every 50 feet of drilling—are made as the relief borehole approaches the target. Since the drill string for the relief well must be pulled for each measurement, the drilling of a relief well becomes very expensive, especially in off-shore drilling, wherein more time may be spent measuring than is spent drilling.

The foregoing systems are widely, and successfully, used; however, the need for time-consuming periodic withdrawals of the drill string so that suitable sensors and electrodes for generating the ground current can be lowered into place to obtain distance and direction measurements from the relief well is a drawback, since a drilling rig operation can cost upwards of $500,000.00 per day in offshore drilling operations. Accordingly, a method and apparatus for making such measurements without the effort and expense of pulling the drill string is needed.

Another difficulty encountered in typical borehole drilling operations such as those described above is that the path of the borehole, which may be a relief well as described above, is tracked during drilling by a "measurement while drilling" (MWD) instrument that is mounted near, but not at, the bottom of the drill string. Usually, a drill string consists of a series of steel tubes, each about 10 meters in length and connected end-to-end. Connected near the bottom end of the drill string is a non-magnetic section which carries the MWD instrument, and connected below that is a hydraulic drilling motor having a bent housing to which the drill bit is connected via a drill shaft, with each of the non-magnetic section and the bent housing being about 10 meters in length. As a result of this, the MWD instrument is typically located 10-20 meters above the face of the drill bit, so that when magnetic field measurements are made with the drill string in the relief well, they are actually made a considerable distance from the drill bit, introducing a significant error in determination of the relative distance and direction of the target with respect to the drill bit. This greatly increases the difficulty of accurately controlling the location of the borehole being drilled with respect to the target.

Accordingly, there is a need for a measurement system that will significantly increase the accuracy of distance and direction calculations in drilling, without withdrawing the drill string from the borehole being drilled.

SUMMARY OF THE INVENTION

Briefly, the present invention is directed to an improved method and apparatus for determining the distance and direction from the drill bit of a drill string in a borehole being drilled to a target location, such as the center of an existing borehole casing, without the need to withdraw the drill string to make the necessary measurements, by making magnetic field measurements from a drill bit sub, or drill head at the bottom of the relief well and communicating those measurements to the surface so that accurate calculations can be made.

In accordance with one aspect of the present invention, the need for pulling a drill string in order to make magnetic field measurements in a relief well, or borehole, is obviated by the use of magnetic field sensors mounted in a drill bit instrument that is secured to the drill bit sub, in combination with a drill string wireline having a suitable current-injecting electrode and a wireline instrument package which can be dropped down through the center of the drill string whenever a measurement is to be made. The electrode is energized with a time-varying current that is injected into the earth to produce a corresponding magnetic field generated by current flow in the target, and the drill bit instrument detects that magnetic field at the drill bit. The drill bit instrument transmits data representing measured field vectors, and the wireline instrument package receives that data and transmits it to the surface for use in guiding further drilling. The wireline is then withdrawn, and drilling can be resumed.

The foregoing process is carried out, in accordance with another aspect of the invention, through the use of a modified drill string structure having at least one insulating segment, but preferably two such segments, spaced apart to electrically isolate a selected conventional tubular, electrically conductive, steel drill string pipe section near the bottom of the string. This electrically isolated section forms a drill string electrode that is located along the drill string for electrical communication with the above-described wireline electrode. Generally, drill string pipe sections are about ten meters in length and are joined end-to-end, with sections being added to the drill string as drilling progresses. In accordance with the invention, each insulating segment, or sub, is about one meter in length, with a single sub generally being sufficient for electrical isolation of an electrode section, although additional insulating subs may be used, as needed. The drill string preferably includes a single such electrode section, although in some circumstances it may be desirable to include two spaced electrode sections separated and isolated from each other by at least one insulating sub. If desired, they may be spaced further apart by including one or more non-electrode steel pipe sections between the insulating subs for the upper and lower electrode sections. The modified drill string includes a nonmagnetic segment, in which is mounted a conventional MWD instrument, and a lowermost (distal) end segment which is a standard rotating drill bit carried in a drill head, or sub, that is connected to a standard directional drilling assembly which may utilize, for example, a hydraulic drilling motor incorporating a bent housing for directional drilling control, in known manner. As is known, such a hydraulic drilling motor may be driven by drilling fluid that flows down the center of the drill string and back up the borehole outside the string. It will be understood that although the present invention is described in a rotary drilling assembly which utilizes a hydraulic drilling motor, such an assembly is only one of many known ways to control the directional drilling of a borehole, and that the present invention may be used in other such drilling assemblies. In accordance with this embodiment of the invention, the drill bit sub carries a magnetic field sensor instrument which incorporates detectors for measuring magnetic fields in the vicinity of the drill bit, and in particular for detecting the vectors of the characteristic magnetic fields generated by current flow in the target.

In this embodiment of the invention, when a magnetic field measurement is to be made using the drill string of the invention, drilling is halted, but instead of withdrawing the drill string, a wireline carrying a wireline electrode and a data receiver and transmitter instrument is lowered through the center of the drill string until the wireline electrode is aligned with the approximate center of the corresponding isolated steel drill pipe electrode section and the transmitter/receiver instrument is located in the nonmagnetic section of the drill string, below the electrode. The wireline electrode is in electrical communication with its corresponding isolated steel drill pipe electrode section which is, in turn, in electrical communication with the surrounding earth formations. When the wireline electrode is energized, the drill pipe electrode injects current from the wireline electrode into the surrounding formations and a portion of that current is then collected in the target. The electrodes are energized by a periodic time-varying current, such as a sinusoidal AC supplied from a power supply at the earth's surface, to produce a characteristic target current and a corresponding characteristic target magnetic field. The wireline electrode is immersed in the drilling fluid in the drill string, and this fluid may be electrically conductive to provide electrical communication between the wireline electrode and its corresponding drill pipe electrode. In the case where a non-conductive drilling fluid is used, spring-loaded contacts may be employed on the wireline electrode to provide a positive electrical contact with the inner surface of the isolated steel drill pipe section.

In accordance with the this embodiment of the invention, the desired magnetic field measurements are made at the drill bit sensor that is located in the drill bit instrument package described above, and which contains the magnetic field detectors. This location for the drill bit sensor is advantageous, because it is at the location of the drill bit that is to be controlled. The drill bit instrument is battery-operated, and in addition to suitable magnetic field vector detectors it includes gravity vector detectors and may include static magnetic field sensors. This drill bit instrument also incorporates suitable communication electronics, such as an electromagnetic solenoid, for transmitting data from the drill bit sensor instrument to the wireline instrument in the drill string. The wireline instrument also includes suitable communication electronics to remotely receive the data from the drill bit sensor and to transmit that data to the surface either directly or via the conventional data communication system incorporated in the MWD instrument in the drill string.

In a second embodiment of the invention, the drill string incorporates at least one, and preferably two spaced electrode sections that are electrically isolated from the remainder of the drill string, includes a conventional MWD instrument mounted above a directional drilling steering assembly which may incorporate a hydraulic drive motor, as discussed above, and includes a drill head mounted on a bent sub and driven by the motor, with a magnetic field sensor instrument mounted on the drill head. In this embodiment, the need for a wireline that can be lowered down the center of the drill stem is eliminated. In its place is a downhole instrument package incorporating suitable telemetry such as transmit/receive communications electronics and located in a nonmagnetic section of the drill string for communicating with the drill head instrument. This instrument package also includes a down-hole electrode power supply such as a battery pack, an alternator, or both, with the power supply being connected through suitable cables to the drill string electrode or electrodes for current injection from the down-hole power source. The drill head sensor instrument includes suitable telemetry such as transmitter and receiver electronics for communicating with the transmit/receive electronics in the down-hole instrument package, which, in turn, communicates with a standard MWD instrument that is also located in the nonmagnetic section. The MWD instrument communicates with surface receivers in conventional manner, as by way of pressure pulses in the drilling fluid, to enable data transfer and control signals to pass between instrumentation at the surface and the drill head sensor instrument.

In another embodiment of the invention, magnetic field measurement accuracy may be improved in some circumstances by operating the system in a pulsed transient mode, wherein the earth formations surrounding the relief and the target wells are energized by a stepped, or pulsed, primary excitation current from a power source, which may be either at the surface or downhole. Measurements of magnetic fields produced by the resulting current flow in the target are made at the drill head sensor instrument immediately following a stepwise turn-off of the excitation current, when that current is zero. Each pulse of electrical energy supplied to the electrodes causes a current to flow through the earth's formations to the target, and, as described in the foregoing U.S. Pat. No. 4,700,142, this current is collected on the electrically conductive target. The resulting target current flow creates a characteristic target magnetic field that is detected by the drill head sensor instrument. In the pulsed, or transient, mode of operation of this embodiment, the magnetic field measurement is made after the primary energizing current stops, so that the magnetic fields that are measured will be entirely due to eddy currents. That is, when the excitation current is stepped to zero, measurements are made of the magnetic fields produced by a decaying target well current flow due to induction effects in the target/earth system. Although this decay current produces only a very small field, since even the primary target current typically is only a few percent of the energizing current, the measurement of the decay field is more accurate, since interfering fields caused by the primary electrode current in the earth are not present. Although use of a single downhole drill string electrode is feasible, the above-described transient pulsed current magnetic field measurement benefits greatly from the use of at least two vertically spaced, electrically isolated conductive drill string pipe electrode sections, each separated from each other and other adjoining pipe sections by one or more electrically insulating subs.

Deep well measurements are made by supplying a time-variable AC current of several amperes at about 10 Hertz, preferably to a pair of isolated drill pipe electrode sections which effectively provide two drill pipe injection electrodes spaced along the drill string above the drill motor. The time-variable current supplied to the electrodes injects a corresponding current into the earth and produces a corresponding time-varying target current. The vectors of the resulting characteristic target magnetic field are detected at the location of the drill bit sub. Telemetry at the drill bit sub transmits the detected vector data uphole via a wireline instrument and/or a conventional MWD instrument for use in calculating the distance and direction from the drill bit sub to the target, and receives control signals from the surface instrumentation.

BRIEF DESCRIPTION OF THE DRAWINGS

The foregoing and other features and advantages of the present invention will be understood by those of skill in the art from the following detailed description of preferred embodiments thereof, taken with the accompanying drawings, in which:

FIG. 5 is a top sectional view of a drill bit sub and included sensor instrument in accordance with the invention, taken along lines A-A of FIG. 6;

FIG. 6 is a cross-sectional view of the drill bit sub and sensor, taken along lines B-B of FIG. 5;

FIG. 12(a) illustrates a drill string electrode excitation current having a transient excitation waveform, in accordance with another embodiment of the invention, while

DESCRIPTION OF PREFERRED EMBODIMENTS

Figures 1, 2:
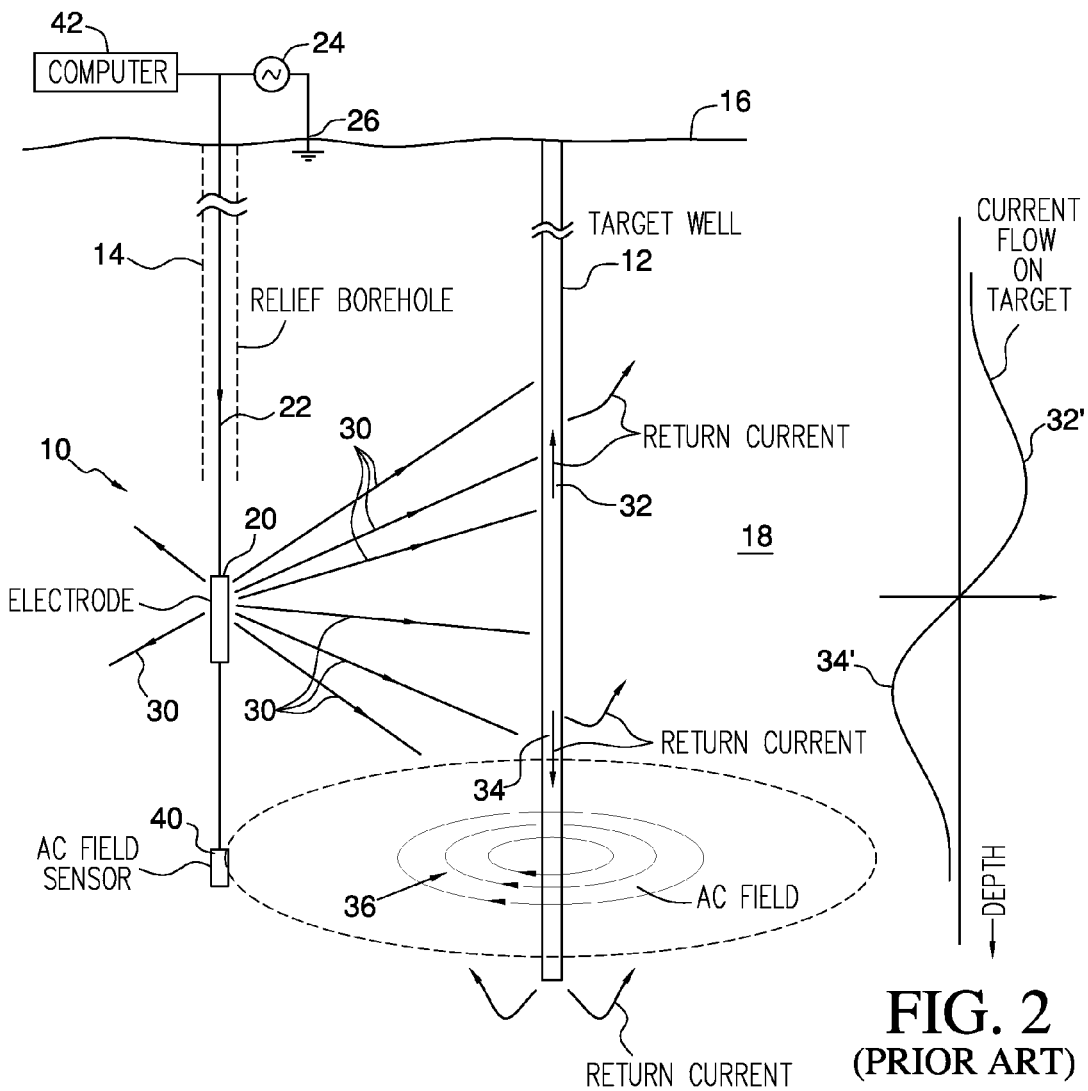
FIG. 1 is a diagrammatic illustration of a prior art electromagnetic target location system.
FIG. 2 is a graph illustrating target current flow amplitude in the system of FIG. 1.

Turning now to a more detailed consideration of the present invention, FIG. 1 illustrates, in diagrammatic form, a standard well locating system 10 such as that described in U.S. Pat. No. 4,700,142, the disclosure of which is hereby incorporated herein by reference. In such a system, a target well 12 is to be located by drilling a second well, or borehole 14 along a path that will approach the target at a desired depth below the earth's surface 16. As is known, the second borehole may be a rescue well that may be intended to intersect a target, may be intended to locate and avoid the target, or may be intended to locate and then be drilled along a path that is parallel the target. For simplicity, such a second borehole may be referred to herein as a relief well, it being understood that it may be drilled for any purpose. Typically the target is a cased well or has a drill string or other electrically conductive material in it, so that electrical current flowing in the earth's formations 18 surrounding the well 12 will tend to be concentrated on that conductive material. An alternating electrical current is injected into the earth by an electrode 20 carried by a logging cable, or wireline 22, which is lowered into the relief borehole 14 after the drill string that is used to drill the relief borehole has been pulled out. The electrode is connected through wireline 22 to one side of an AC source 24, the other side of which is grounded at 26 to the earth 16. The electrode 20 contacts the uncased sides of the relief well so that current from source 24 is injected into the earth formations 18, as illustrated by arrows 30.

This injected current, which returns to the grounded side of the generator at 26, finds a path of least resistance through the casing or other conductive material in target well 12, producing a target current flow indicated by arrows 32 and 34, respectively, above and below the depth of the electrode 20. The upward current flow of current 32 is illustrated in FIG. 2 by curve 32', while the downward flow of target well current 34 is illustrated in FIG. 2 by curve 34'. As illustrated, at the depth of the electrode equal and opposite currents on the target produce a net zero target current, while above and below that point the target currents maximize and then decline due to leakage into the surrounding formation, as illustrated in FIG. 2, with these target well currents eventually returning to the ground point 26 through the earth.

The concentrated current flow on the target well produces, for the downward current 34, for example, a corresponding AC magnetic field 36 in the earth surrounding the target well. This target AC field is detectable by an AC field sensor, or sonde, 40 that is suspended in the relief well 14 by the wireline 22. The sonde 40, which preferably is located below the electrode 20, incorporates suitable field component detectors, such as three orthogonal magnetometers, to measure the vector components of magnetic field 36 and to produce corresponding data signals that are transmitted via the wireline to, for example, a computer 42 at the surface.

Vector signals obtained from the magnetometers in the sensor 40, together with measurements of other parameters such as the orientation of the sensor, permit calculation of the direction and distance of the target well casing from the sensor, as described, for example, in U.S. Pat. Nos. 4,700,142 or 5,512,830. In the course of drilling the relief well, the drill string is withdrawn periodically and the wireline is lowered into the relief borehole so that vector measurements and measurements of the orientation of the sensor within the borehole can be made, and these, together with measurements of the relief well direction made either at the same time or from previously made borehole survey data, permit a continuous calculation of the presumed location of the target well with respect to the location of the relief well. The wireline is then withdrawn and the drill reinserted into the relief well, and the calculated information is used to guide further drilling of the relief well. As the relief well approaches the desired depth, its approach to the location of the target well can be guided so that the target well is intersected at the desired depth below the earth's surface.

As discussed above, such prior systems require the withdrawal of the drill string from the relief well in order to measure the target magnetic field. A preferred form of the improved system of the present invention allows target field measurements without requiring the withdrawal of the relief drill string, and is illustrated at 50 in FIG. 3, to which reference is now made. In accordance with this first embodiment of the invention, a relief borehole, or well 52, which is illustrated in dashed lines, is produced by a drill carried by a drill string 54 which is suspended from a surface drilling rig (not shown), in conventional manner. Such a drill string typically consists of multiple drill string sections of steel pipe, such as the illustrated sections 56, 57, 58 . . . 59, each normally about ten meters in length and coupled together end-to-end at threaded joints. In conventional manner, the bottom, or distal end of the drill string incorporates a standard rotary steering assembly such as the illustrated hydraulic drilling motor 62 in a bent housing 64, with the motor having a rotating drive shaft 66 connected to a drill bit 68. In accordance with the invention, the drill bit is carried by a drill bit head, or instrument sub 70, to be described in detail below, which rotates with the drill bit. Located in the drill string 54 just above the housing 64 is a conventional measurement-while-drilling (MWD) measurement instrument for use in producing a log of the drilling and for controlling the direction of drilling.

Figure 3:
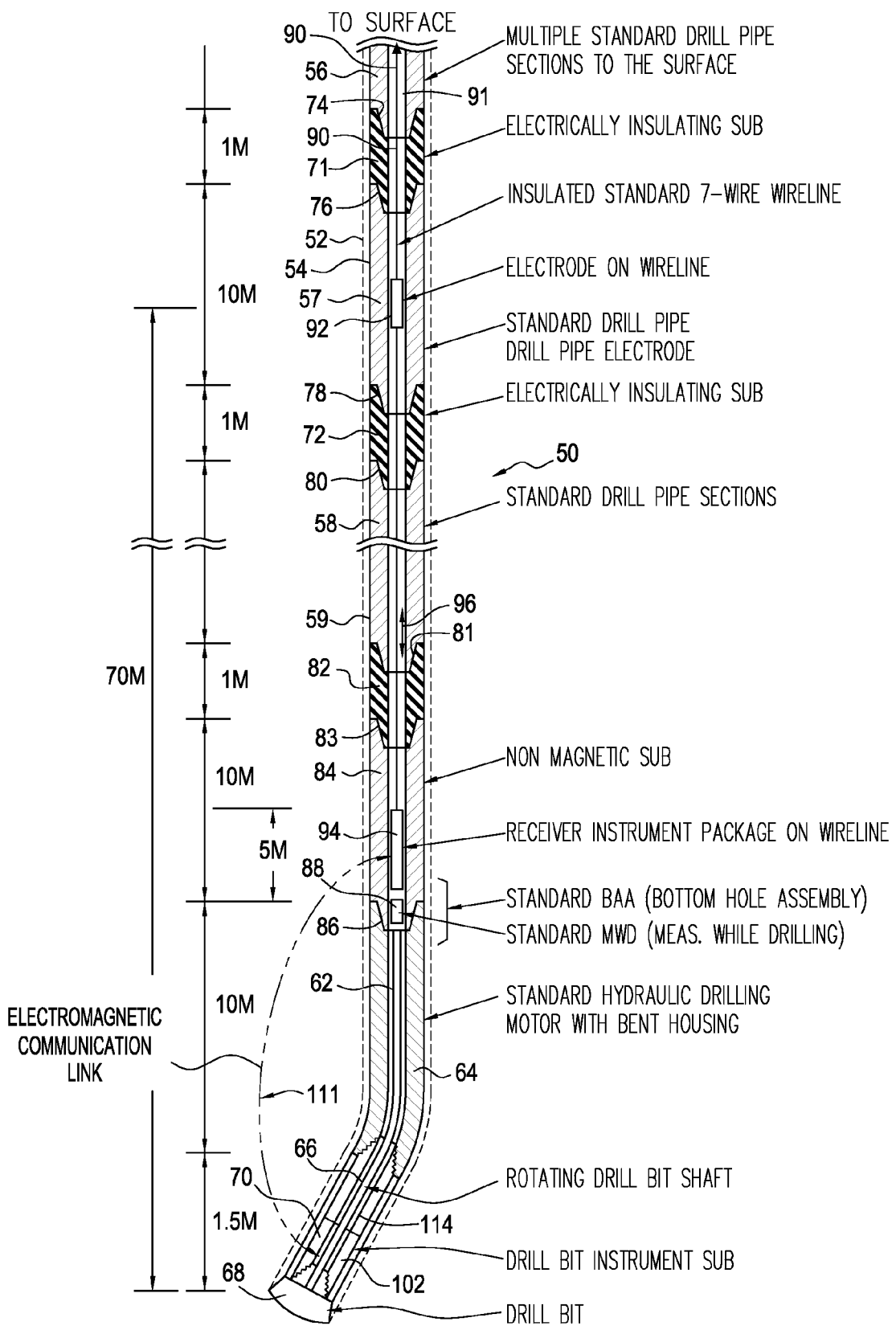
FIG. 3 is a diagrammatic illustration of a wire line electrode system in accordance with a first embodiment of the present invention, illustrating typical dimensions.

In accordance with one embodiment of the invention, at least one of the electrically conductive drill pipe sections; for example section 57, is electrically isolated from adjacent drill pipe sections to form a pipe electrode for use in injecting current into the surrounding earth formations. This pipe electrode 57 is formed by inserting one or more electrically insulating subs 71 and 72, which may be short insulating pipe sections about one meter in length, in the drill string above and below the drill pipe section 57 that is to be isolated, as illustrated in FIG. 3. The insulating sub 71 is threaded to the bottom of standard steel pipe section 56 at threaded joint 74, and to the top of standard steel pipe section 57, at threaded joint 76, to space and electrically insulate the adjacent pipe sections 56 and 57 from each other. The second insulating sub 72 is threaded to the bottom of the steel drill pipe section 57 at threaded joint 78 and to the top of the next adjacent steel drill pipe section 58 at threaded joint 80. Sub 72 separates, and electrically insulates, adjacent steel pipe sections 57 and 58 from each other, thereby electrically isolating pipe electrode section 57 from the remainder of the drill string.

Although a single insulating sub is shown at each end of pipe section 57, it will be understood that multiple insulating subs may be used at each location to improve the isolation of pipe 57, as needed, or the insulating subs may be omitted if the resulting degraded performance is acceptable. The system will work without the upper insulated sub 71 because the "easy way" to return to the surface is through the earth, rather than along the walls of the drill pipes. The lower insulated sub 72 is very desirable, however, for even very tiny stray currents in the drill pipes in the vicinity of the sensor instruments (to be described) will seriously degrade the operation of the system.

Connected below the isolated drill pipe electrode section 57 are one or more additional steel drill pipe sections such as sections 58 . . . 59, the number of drill pipe sections being selected to position the electrode section 57 at a desired distance above the drill bit. A suitable distance between the pipe electrode 57 and the drill bit 68 may be about 70 meters.

The lowermost end of the bottom drill pipe 59 preferably is connected at a threaded joint 81 through an electrically insulating sub 82 and a threaded joint 83 to a nonmagnetic drill pipe section 84, the lower end of which is connected at threaded joint 86 to the top of the directional drilling steering assembly housing 64. A standard MWD instrument in an MWD housing 88 preferably is located within the nonmagnetic pipe section 84 in conventional manner for controlling the operation of the steering assembly in conventional manner.

Locatable within the drill string 54 is a wireline 90, which is suspended from the earth's surface at the drill rig. During pauses in the drilling operation, the wireline is lowered into the relief well down through a central, axially-extending opening 91 in the drill string. The drilling fluid flows through this axial opening, and when a hydraulic drive motor is used in the steering assembly to drive the motor 64, the central opening effectively terminates at the top of the motor. The wireline incorporates both a power cable for injecting AC current into the earth and a data cable for connecting downhole instruments with the surface, and is covered by an insulating material such as an electrically insulating layer of a plastic such as Hytrel for protection from the harsh environment. The power cable in the wireline is connected at the surface to a suitable source 24 (FIG. 1) of a periodically varying current such as a low-frequency AC to produce alternating current 96 in the cable, and is connected at its lower end to an electrode 92 which is uninsulated and is located on the wireline for electrical communication with the interior of the isolated drill pipe section 57. This electrode may physically contact the interior of section 57 by way of spring-loaded contacts, for example, although a good electrical connection can be made through the drilling fluid, or drilling mud, if it is electrically conductive, since this fluid remains within the drill string during this process. Many modern drilling fluids are a non-conductive synthetic material that is approximately 60% oil and 40% water, however, so a mechanical contact between the wireline electrode and the drill pipe may be preferred. The electrode 92 is accurately locatable centrally along the length of the drill string electrode section 57 simply by measuring the depth of the drill string.

The data cable in the wireline is connected at its lower end to an instrument package 94 that is secured to the distal end of the wireline, below the electrode 92, with the wireline being long enough to locate this package centrally within the nonmagnetic sub 84, and is connected at its upper end to suitable control circuitry at the surface, such as a computer 42 (FIG. 1).

Because the MWD measuring instrument 88, which is conventionally used to measure the magnetic fields generated in the earth by current flowing in the target, as discussed above, is located above the hydraulic drilling motor 64 in the illustrated embodiment, magnetic field and other measurements needed for determining the distance and direction to the target and for guiding the drilling operation are normally received at a distance of 10 to 20 meters behind (or above) the actual location of the drill bit 68 that is being controlled. When target magnetic field vectors are determined at this distance above the bit, inaccuracies in the control of the drill bit occur, and these can produce unacceptable errors when the relief well is approaching the target.

Figure 4:
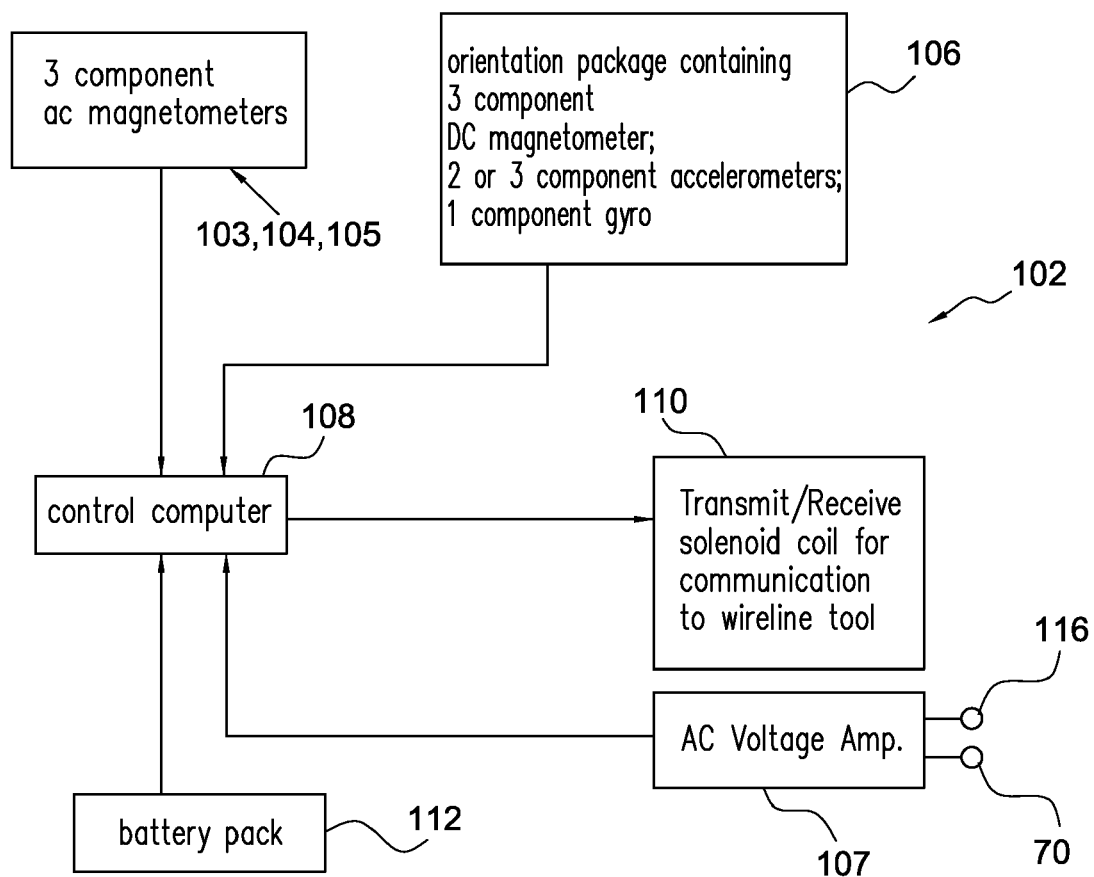
FIG. 4 is a schematic diagram of a drill bit sub sensor instrument in accordance with the present invention.

The foregoing problem is overcome, in accordance with the present invention, by providing magnetic field and other sensors in a drill bit sensor instrument 102 mounted on the drill bit sub 70. A schematic diagram of a suitable sensor instrument 102 is illustrated in FIG. 4, while an enlarged view of the sensor instrument is illustrated diagrammatically in FIGS. 5 and 6. As shown in these Figures, the instrument 102 incorporates a three-part AC magnetometer having sensor components 103, 104, and 105 for measuring x, y and z vector components of a varying electromagnetic field H that is generated by current flow on a target such as a well casing. These magnetometer sensor components may be constructed, for example, using coils surrounding U-shaped cores in accordance with the teachings of U.S. Pat. No. 4,502,010, mentioned above. The instrument 102 also contains an orientation package 106 for determining the orientation of the AC magnetometers. For this purpose, package 106 may contain two-component or three-component accelerometers, a one-component gyroscope and a 3-component earth field DC magnetometer for detecting vector components of perturbations in the Earth's field. These apparent Earth field measurements can also be used to determine any static magnetic fields generated by the target well. From these various measurements the relative location of the target well with respect to the drill bit sensor instrument 102, and thus with respect to the drill 68, can be determined using well known methods of magnetic field analysis.

The drill bit instrument 102 also incorporates an AC voltage amplifier 107, whose input terminals are connected to measure the voltage difference between the outer sleeve 116 and the drilling motor which is connected to the drill bit instrument body 70. This AC voltage difference gives the polarity and magnitude of the electric field in the nearby Earth and thus provides a direct measurement of the sense of the AC current flow on the target well relative to the measured AC magnetic field vectors $Hx_1$, $Hx_2$, $Hy_1$, $Hy_2$, and $Hz$. With a symmetric AC current waveform on the target well there may be some ambiguity in the sense of the current flow which is removed by this measurement. This sign ambiguity can also be determined by including an even time harmonic component to the AC current injected into the formations. In many cases this ambiguity also can be removed by well known, indirect means such as by noting the character of measurements at other nearby depths.

The magnetometer components 103, 104, and 105, the orientation package 106, and the AC amplifier 107 are connected to a down-hole control computer 108 in the instrument 102 for preliminary processing of received data and the computer is, in turn, connected by way of suitable communications telemetry, such as a transmit/receive solenoid coil 110, for wirelessly transmitting data to the wireline instrument package 94, illustrated in FIG. 3, via the communications link 111. Although the link provided by such solenoids have a limited communication range when used underground, sufficient power is provided by a battery pack 112 in the drill sub instrument 102 to provide reliable data communication between the instrument 102 and the wireline instrument 94, which is normally less than about 30 meters distant. In order to preserve power, the computer 108 contains control circuitry that responds to the absence or presence of output signals from the magnetometers 103, 104 and 105, in response to magnetic fields generated in the target, to turn the instrument off when it is not being used, and on when field measurements are to be made.

As illustrated in FIGS. 5 and 6, the drill bit sensor instrument 102 is mounted in a cavity 113 in the drill bit sub 70. The sub 70 surrounds an axial opening 114 through which the drill motor shaft 66 extends to drive the drill bit 68, with the communication solenoid 110 being wrapped around the inner wall of cavity 113 to surround the axial opening 114. Cavity 113 is covered by a stainless steel cover tube 116 that is secured in place on the drill bit sub by a suitable insulating adhesive. The drill bit sub 70 is threaded at its upper end 118 to engage the threaded lower end of housing 64, while the lower end 120 of sub 70 is threaded to receive the drill bit.

Figure 7:
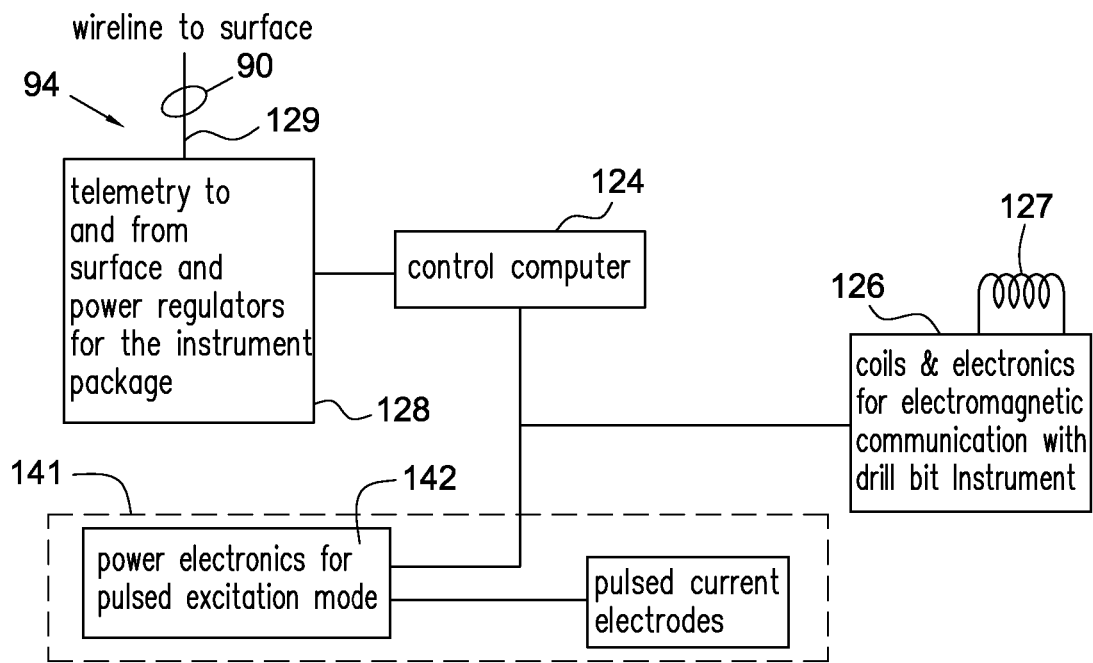
FIG. 7 is a diagrammatic illustration of a wireline instrument suitable for use in the system of FIG. 3.

The main wireline instrument 94 carried at the end of the wireline 90 is illustrated schematically in FIG. 7 as incorporating a control computer 124 connected to suitable communications telemetry such as an electromagnetic transmit/receive communication circuit 126, which may include a solenoid 127, that is similar to the coil 110 illustrated in FIG. 6, for receiving data from the drill bit instrument 102, and, optionally, for controlling the operation of instrument 102. The computer 124 also is connected to computer 42 at the surface by telemetry circuit 128 via data cable 129 carried by wireline 90.

In accordance with the method of the present invention, drilling of a relief or other borehole is carried out, for the most part, in the known manner illustrated in FIG. 1, but using the drill string structure described with respect to FIGS. 3, 4, 5 and 6. In the illustrated form of the invention, drilling fluid flows down through the center of the drill string 50 to provide driving power for the bent sub hydraulic drilling motor 62, and the direction of drilling is controlled by turning the drill string so that the borehole will be drilled in the direction faced by the bent housing and the drill bit. It will be understood, however, that other conventional directional drilling assemblies may be used to drive the drill bit and to steer the drilling of the borehole. The drill bit instrument 102 in sub 70 rotates with the drill bit, but is turned off during drilling, while the MWD system 88 controls the drilling operation in known manner.

In order to precisely measure the distance and direction from the drill bit to the target to permit accurate guidance of further drilling, the drilling is stopped, and the wireline 90, incorporating at least the first electrode 92 and its instrument package 94, is lowered down the center of the drill string. If necessary, the drilling fluid can be pumped to assist in carrying the wireline down the drill string. The instrument 94 is lowered into the nonmagnetic sub 84 so that the wireline electrode 92 is positioned in its corresponding drill pipe electrode section 57. The electrodes are in effective electrical contact with each other, so that when power is supplied from source 24, the drill pipe section 57 acts as an injection electrode for injecting electrical current into the earth surrounding the borehole. Although the power supply 24 is preferably a low-frequency AC source, as described above, a DC source may be used if desired, with down hole switching providing alternating or pulsed current to the surrounding earth formations. The pipe section 57 produces current flow in the earth by contacting the earth directly or through the drilling fluid that flows up-hole around the outside of the drill string from the region of the drill bit to the surface.

As noted in FIG. 3, standard steel drill pipe sections, such as sections 57, 58 and 59, are usually 10-meter long threaded pipes, the nonmagnetic pipe section 84 is also nominally 10 meters long, and the threaded, electrically insulating subs, such as subs 71, 72 and 82, are each about 1 meter in length. The standard hydraulic motor housing 64 is nominally 10 meters long, and the rotating drill bit shaft 66 with its bit 68 and instrument sub 70 is about 1.5 meters long. When the drill string is assembled, then, the relative locations of the nonmagnetic sub 84 and the electrode pipe sections 57 are known, as is the total length of the drill string, so that the wire line can easily be positioned in the drill string with the wireline electrode 92 properly located centrally along the length of its corresponding drill pipe electrode sections. The distance between the electrode 92 and the drill head 68 will depend on the number of pipe sections inserted between sections 59 and 60 (in FIG. 3), but desirably this distance will be approximately 70 meters.

Figure 8:
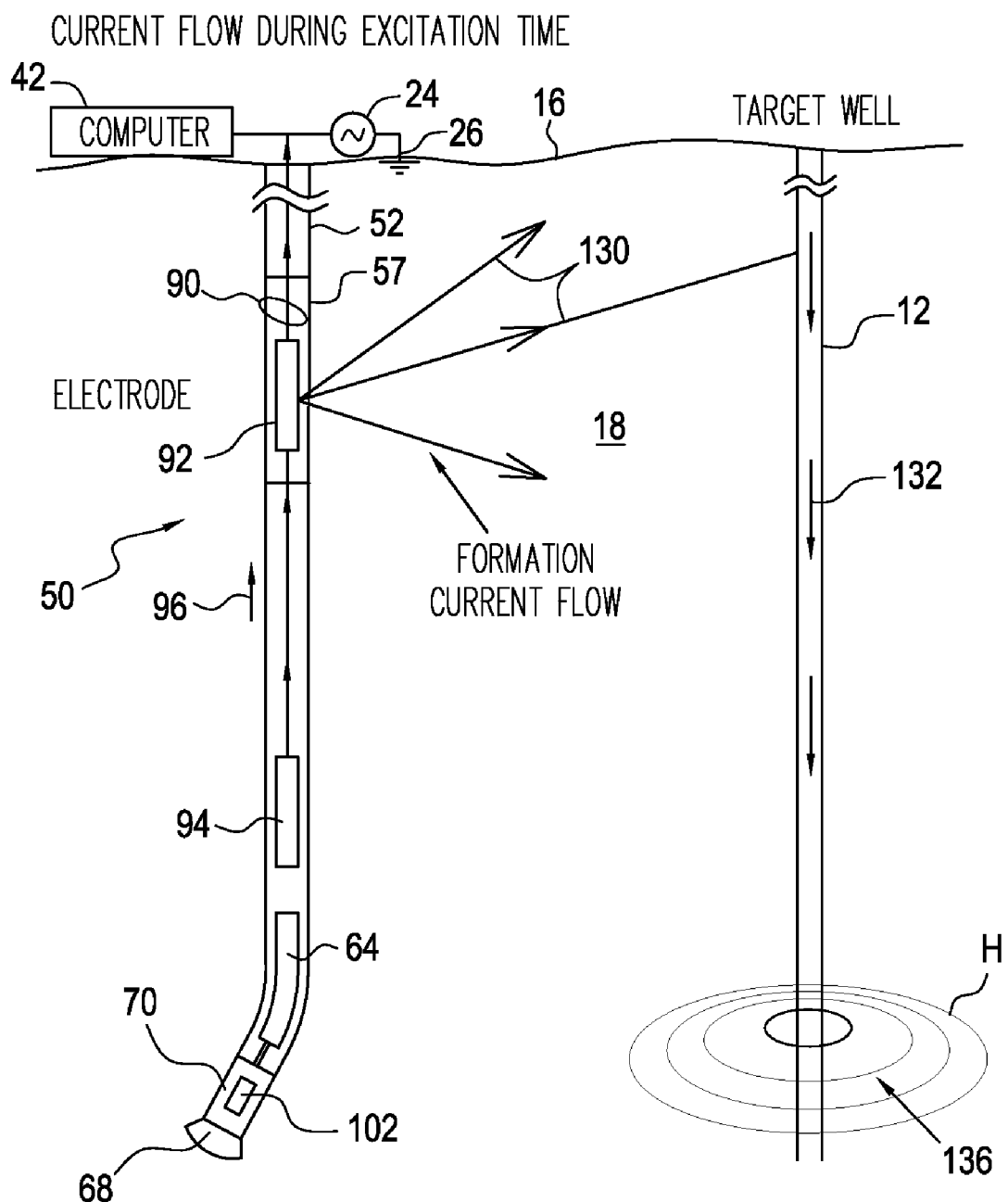
FIG. 8 is a diagrammatic illustration of formation and target current flow for a single-electrode system of the present invention.

After the wireline 90 is positioned in the drill string, electrode 92 is energized, as illustrated in FIG. 8, to inject several amperes of current 130 having, for example, a frequency of about 1 to 20 Hertz, into the earth formation 18 surrounding the target well 12 and the relief well 52. As in the prior art described with respect to FIGS. 1 and 2, the injected current flow through the earth eventually returns to the ground point 26, with part of this alternating current flowing through the conductive path of least resistance in target well 12, as illustrated at 132 in FIG. 8. The target current 132 has the amplitude vs. depth characteristic illustrated by FIG. 2, with the maximum current on the target occurring at a depth that is approximately midway between the electrode 92 and the earth's surface, and at a similar distance below the level of the electrode. The current 132 produces a corresponding target magnetic field 136 around target well 12, as was described with respect to FIG. 1, which field is detectable by the drill bit instrument 102. At the drill bit, target field vectors and other measurements are processed and transmitted electromagnetically to the wireline instrument package 94 for retransmission to the computer 42 at the earth's surface. Since this target field is measured at the drill bit, the calculations made by computer 42 of the distance and direction from the bit to the target are more accurate than would be possible at the depth of the wireline instrument package 94 or with measurements made at the conventional MWD instrument located above the motor 64.

Figure 9:
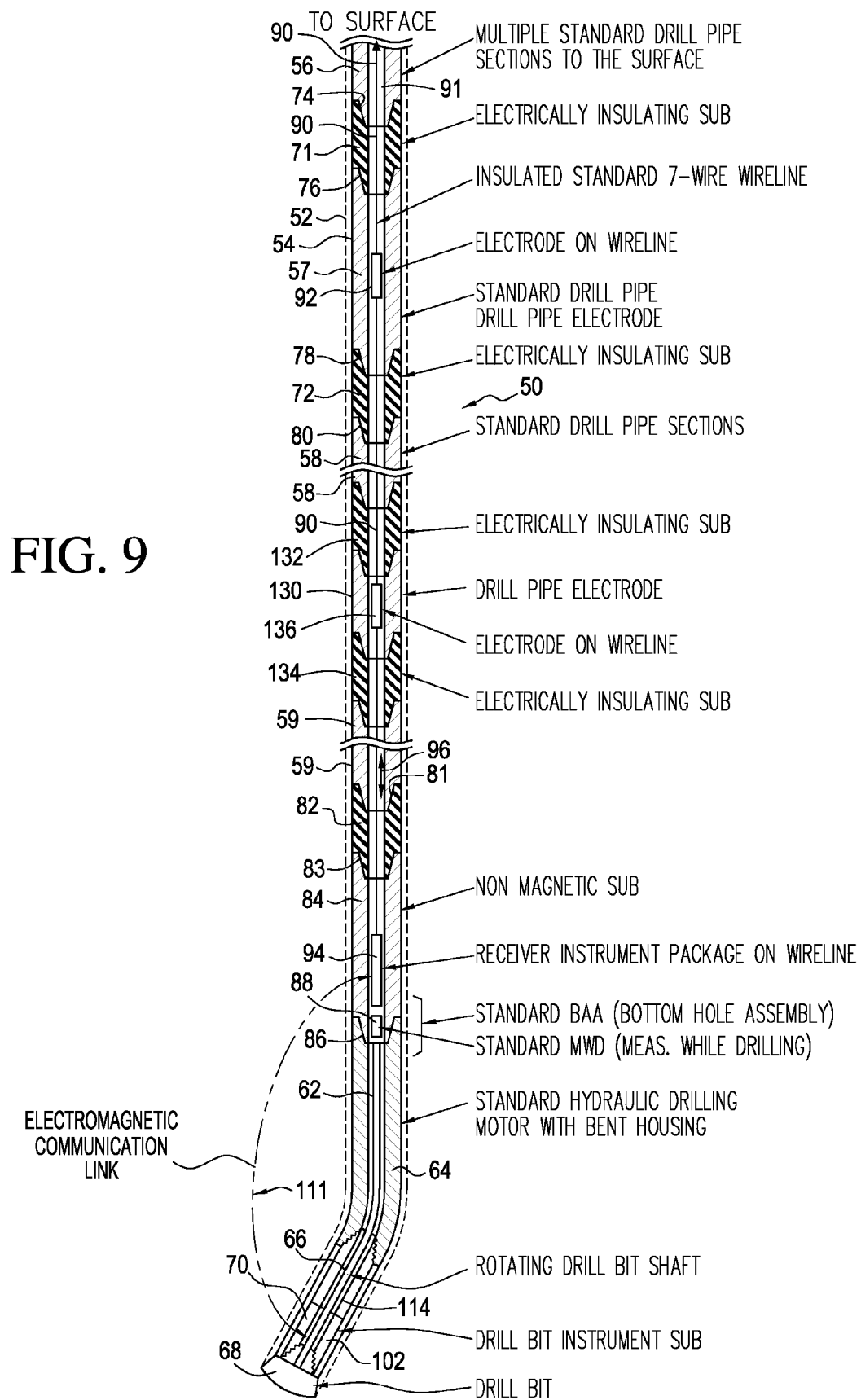
FIG. 9 is a diagrammatic illustration of a modified version of the wire line electrode system of FIG. 3, in which two vertically spaced drill string electrodes are provided.

Another embodiment of the invention, which may be desirable in some circumstances, is illustrated in FIG. 9, wherein components similar to those of FIG. 3 are similarly numbered. In this embodiment, a second electrically isolated steel pipe section, such as a drill pipe section 130 connected between upper and lower insulating subs 132 and 134, may be provided in the drill string to form a second drill string electrode. The section 130 is illustrated as being spaced below drill pipe section 58 and above section 59 so that it is suitably spaced from, and electrically insulated from, both the drill pipe electrode 92 and the instrument package 94. When such a second electrode pipe section is provided, the wireline will carry a second electrode 136 which will be positioned within the second drill pipe electrode section 130 when the wireline is inserted in the drill string. The wireline electrode 136 will then make electrical contact with the interior of the pipe electrode 130 through physical contact and/or via conductive drilling fluid in the drill string. This second wireline electrode 136 is connected to the AC source 24 through the wireline power cable, as described for electrode 92. This two-electrode system operates in a manner similar to that described above.

Figure 10:
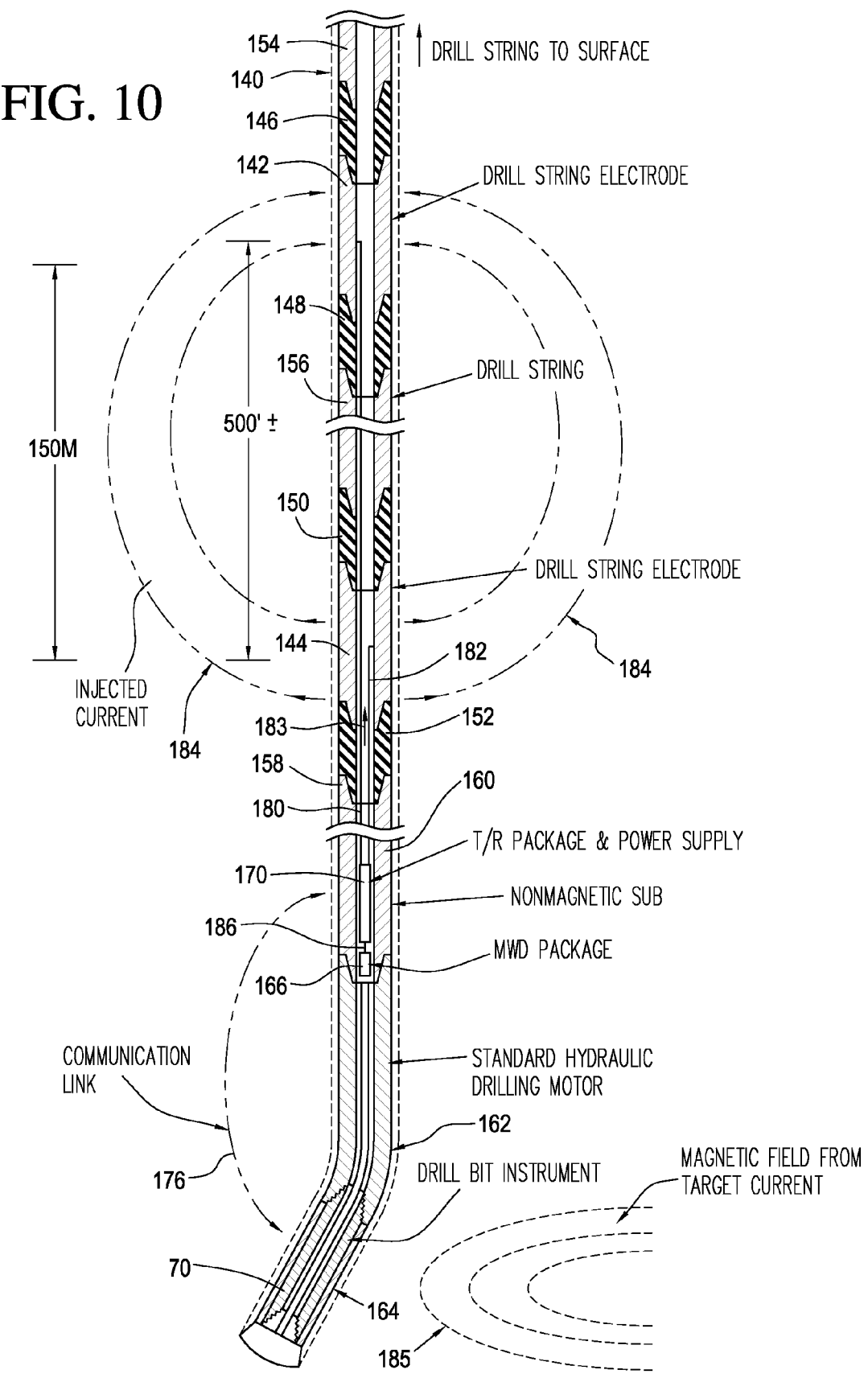
FIG. 10 is a diagrammatic illustration of a second embodiment of the present invention, incorporating drill string electrodes connected to a downhole power supply.

In still another embodiment of the invention, diagrammatically illustrated in FIG. 10, a drill string 140 in a borehole being drilled incorporates at least one, and preferably two spaced electrode sections 142 and 144 that are electrically isolated from the remainder of the drill string by respective electrically insulating subs 146, 148 and 150, 152, in the manner discussed above with respect to FIGS. 3 and 9. The drill string includes conventional drill string sections above the electrode section 142, as illustrated at 154, and between the electrode sections 142 and 144, as illustrated at 156, the number of sections at 156 being sufficient to space the electrode sections 142 and 144 apart by about 150 meters. Additional conventional drill pipe sections are provided at 158 between the drill pipe electrode 144 and a nonmagnetic drill pipe section 160 to space the lower electrode about 70 meters above a standard directional drilling assembly such as the illustrated conventional bent sub hydraulic drilling motor 162 and drill head, or sub 164 at the distal end of the drill string, in the manner described above with respect to FIGS. 3 and 9. As before, the nonmagnetic drill pipe section 160 incorporates a conventional MWD instrument 166 mounted above the hydraulic drive motor, and the drill head, or sub 164, which is mounted on the bent sub 162 and is driven by the motor, carries the magnetic field sensor instrument 70 with instrumentation 102, described above with respect to FIG. 4.

Figure 11:
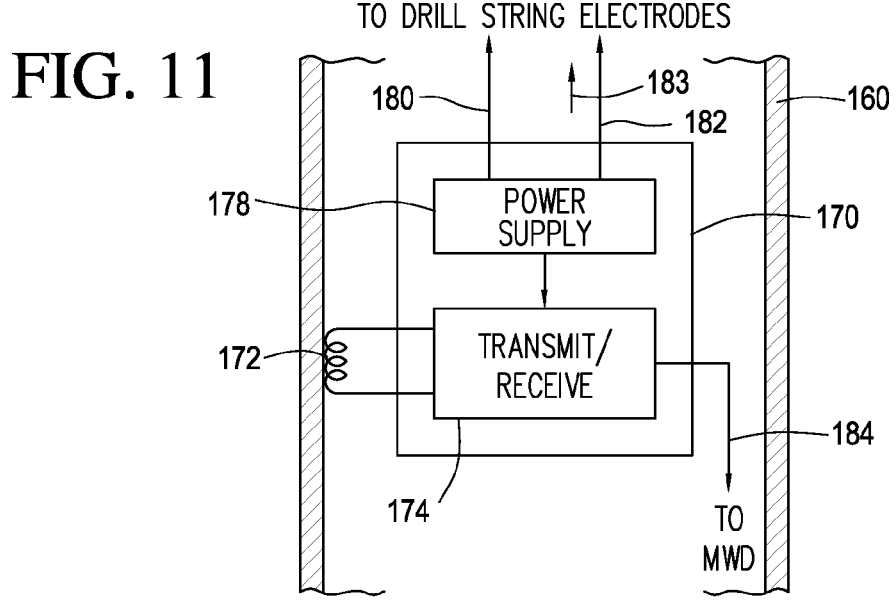
FIG. 11 is a diagrammatic illustration of the transmit/receive package and power supply of the embodiment of FIG. 10.

In the embodiment of FIG. 10, the need for a wireline that can be lowered down the center of the drill stem is eliminated. In its place are communications electronics such as a transmit/receive (TR) package 170 located in the nonmagnetic section 160 of the drill string. As illustrated in FIG. 11, the TR electronics package 170 preferably includes a solenoid 172 and TR circuitry 174 for communicating with the drill head instrument 70 via an electromagnetic link illustrated at 176 in FIG. 10. The package 170 also incorporates an electrode power supply 178, such as a battery pack and a suitable inverter, an alternator, or both, with the power supply being connected through suitable cables 180 and 182 to the drill string electrodes 142 and 144, respectively. The power supply provides AC current 183 to the electrodes for injection into the formations surrounding the borehole, as illustrated at 184, to provide a target current flow and its corresponding target magnetic field 185. The drill head sensor instrument 102 includes sensors 103, 104, and 105 for detecting the target magnetic field and the transmitter and receiver 110 for communicating data corresponding to the detected magnetic field to the transmit/receive package 170. The TR circuitry 174 in package 170 is connected by way of data cable 186 to the standard MWD instrument 166 that is also located in the nonmagnetic section. The MWD instrument then transmits this data to surface receivers in conventional manner, as by way of pressure pulses in the drilling fluid. The MWD instrument also receives control signals from the surface, again in a conventional manner, which signals are communicated to the drill bit instrument 102 by way of the TR package 170 to control drilling operations in conventional manner, as well as to initiate the injection of current and the measurement of the resulting magnetic fields when drilling has been stopped, and to enable data transfer between instrumentation at the surface and the drill head sensor instrument.

Figure 12A:
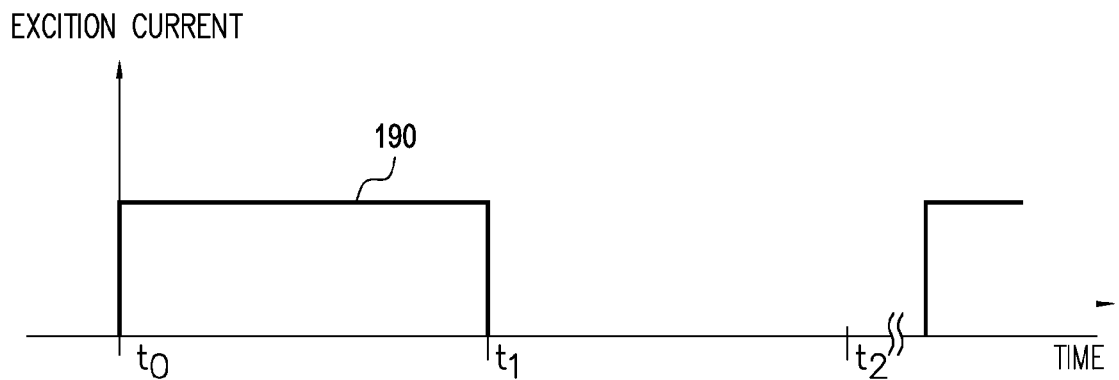
Figure 12B:
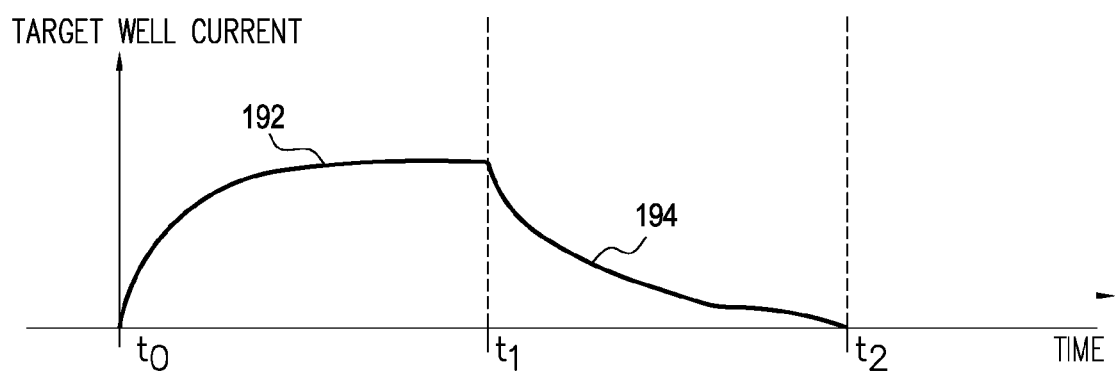
FIG. 12(b) illustrates a corresponding target waveform caused by the excitation current of FIG. 12(a) and exhibiting a transient decay due to eddy currents.
Figure 13:
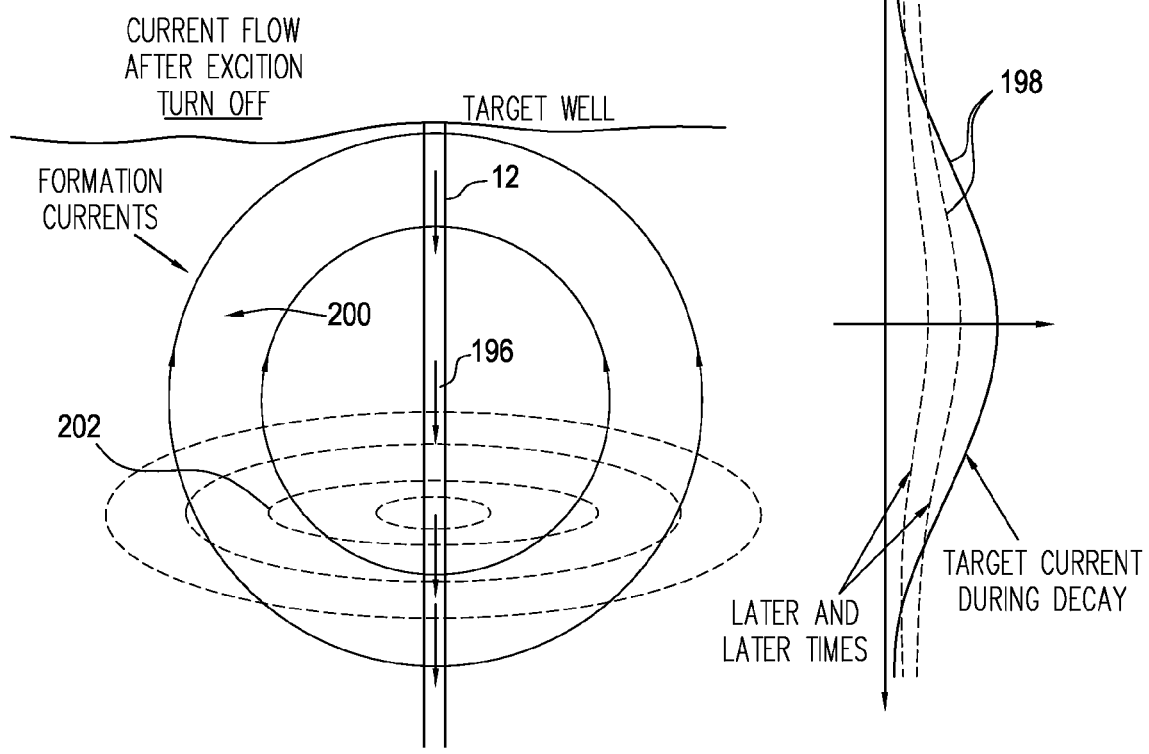
FIG. 13 illustrates magnetic fields generated in a surrounding earth formation by a decaying target current flow.
Figure 14:
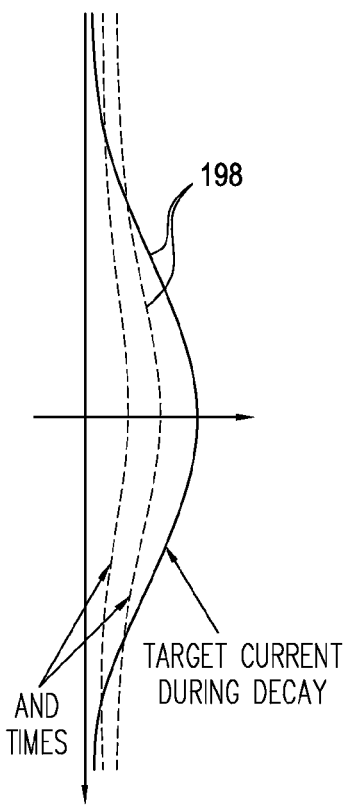
FIG. 14 illustrates decaying current flow amplitudes in a target.

As has been described above, the current injected into the Earth formations surrounding the drill string in the borehole being drilled is a low-frequency alternating current with an amplitude of several amps. However, in another form of the invention, the injection current supplied to the drill string electrode configurations from the power supplies described above may be a transient pulsed signal, as illustrated by the square wave 190 in FIG. 12(*a*), which starts at time $t_0$ and stops at time $t_1$ and has a repetition rate of multiple times per second. The current to be injected into the surrounding formations, for example current 96 in FIG. 8 or current 183 in FIG. 10, may be several amperes in amplitude, and produces the corresponding formation currents 130 (FIG. 8) or 184 (FIG. 10) and target current 132, also illustrated in FIG. 8. The current path in each of the two-electrode configurations of FIGS. 9 and 10, forms an inductive loop and causes the target well current (132 in FIG. 8) to increase from $t_0$ to $t_1$ as illustrated by curve 192 in FIG. 12(*b*), and at time $t_1$, when the square wave pulse ends, the target well current begins to decay, as illustrated by curve 194. This "L/R" time decay, which is caused by eddy currents primarily in the target but also in the surrounding earth formations, is about 1.5 milliseconds for typical earth formations in an environment such as an oil field and is illustrated in FIG. 13 as a decay current 196 in a target such as well 12. This decay current in the target well decreases in amplitude over time, as illustrated by curves 198 in FIG. 14, flows into the surrounding formation, as indicated at 200, and produces a decay current magnetic field 202 surrounding the target well, as illustrated in FIG. 13. The vector components of this target magnetic field 192 are detected by the magnetometers 103, 104, and 105 in the drill bit sensor instrument 102, with the AC field measurements being made at 102 during the decay period $t_1$ to $t_2$. The measurements made during this time are free of the interference that is caused by magnetic fields generated by the drilling well currents 96 or 183, by related leakage currents, and by formation effects, thereby providing more accurate and reliable measurements for use in determining the location of the target.

The AC field measurement data, the AC voltage data, and the orientation measurement data obtained by the drill bit sensor instrument 102 are partially processed by control computer 108 in sensor instrument 102 and are sent by the two-way electromagnetic communication package 110 to the main instrument package 94 (FIGS. 3 and 9) on the wireline, or to the package 170 in the system of FIG. 10. This data is then transmitted up-hole by way of the data cable on wireline 90 in the embodiments of FIGS. 3 and 9, or by the MWD instrument in the embodiment of FIG. 10, to the surface computer 42 for processing. If desired, this computer may then send appropriate control signals by way of wireline 90 to the instrument 94 or by way of the mud pulses, for example, to the MWD instrument 166, which may transmit these control signals electromagnetically to the drill bit control computer 108 to turn the sensor instrument 102 on or off. Alternatively, the sensor instrument may be turned on or off automatically when it detects, or no longer detects, a target magnetic field. When the data collection has been completed, drilling operations resume, using directional controls derived from the distance and direction data obtained from the downhole magnetic field and orientation data at the bit instrument 102 to guide further drilling via the MWD instrument.

Although the present invention has been described in terms of preferred embodiments, it will be understood that numerous modifications and variations in the apparatus described herein may be made without departing from the true spirit and scope of the invention as set out in the following claims.

What is claimed is:

1. Apparatus for target proximity detection from a borehole being drilled, comprising:
   a drill string having multiple drill pipe sections connected end-to-end and carrying a drill bit;
   at least one of said drill pipe sections being electrically conductive to provide a drill pipe electrode section;
   at least one electrically insulating drill pipe sub electrically isolating said electrode section from adjacent drill pipe sections;
   a power supply in electrical communication with said at least one drill pipe electrode section and energizable to inject a time-varying current into Earth formations surrounding said borehole;
   a drill bit instrument at said drill bit for detecting magnetic fields produced by said injected current; and
   communication electronics located in said drill string for establishing communication between said drill bit instrument and surface instrumentation for sending detected magnetic field data to said surface instrumentation.

2. The apparatus of claim 1, further including:
   a wireline locatable within said drill string, said wireline incorporating a wireline electrode connected to said power supply for electrical communication with said drill string electrode for injection of said time-varying current into Earth formations; and
   wherein said wireline carries a part of said communication electronics for communication of detected magnetic field data to said surface instrumentation.

3. The apparatus of claim 2, wherein said drill string further includes:
   first and second electrically conductive drill pipe electrode sections spaced apart along the length of the drill string and electrically isolated from each other and from adjacent drill pipe sections by electrically insulating drill pipe subs; and
   first and second electrodes on said wireline, said wireline electrodes being spaced to be located within and in electrical communication with respective first and second drill pipe electrode sections when said wireline is inserted in said drill string.

4. The apparatus of claim 1, wherein said drill bit instrument incorporates first magnetic field sensors for detecting vector components of time-varying magnetic fields characteristic of said injected current and second magnetic field sensors for detecting static magnetic field vectors.

5. The apparatus of claim 4, wherein said communication electronics includes drill bit telemetry in said drill bit instrument and wireline telemetry carried by said wireline.

6. The apparatus of claim 1, wherein said drill string further includes:
   first and second electrically conductive drill pipe electrode sections spaced apart along the length of the drill string and electrically isolated from each other and from adjacent drill pipe sections by electrically insulating drill pipe subs; and
   wherein said power supply is located in said drill string and is electrically connected to said first and second drill pipe electrode sections.

7. The apparatus of claim 6, wherein said power supply is a battery.

8. The apparatus of claim 1, further including a directional drilling assembly connected at a distal end of said drill string between said drill pipe sections and said drill bit to drive said drill bit.

9. The apparatus of claim 8, further including:
   a wireline locatable within said drill string, said wireline carrying at least one wireline electrode for electrical connection to said at least one drill string electrode and carrying said communication electronics for location within a non-magnetic drill string section above said directional drilling assembly, said drill bit being located below said directional drilling assembly;
   magnetic field sensors mounted in said drill bit instrument for detecting said varying magnetic fields;
   an orientation package located in said drill bit instrument;
   wherein said communication electronics includes a transmitter in said drill bit instrument for transmitting data from said magnetic field sensors and said orientation package to said surface instrumentation.

10. The apparatus of claim 9, wherein said communication electronics further includes a receiver carried by said wireline for receiving said data and retransmitting it to said surface instrumentation.

11. The apparatus of claim 9, wherein said drill bit instrument is mounted in a housing at said drill bit, the apparatus further including an AC amplifier mounted in said drill bit instrument for measuring electric fields between said directional drilling assembly and said housing to resolve sign ambiguity of detected magnetic fields.

12. Apparatus for deep well measurements in a borehole being drilled to determine the distance and direction from the borehole to a target, comprising:
   a drill string in said borehole, the drill string having multiple drill pipe sections connected end-to-end and carrying at a distal end a directional drilling assembly and a drill bit sub;
   at least one of said drill pipe sections being electrically conductive to provide an electrode section;
   at least one electrically insulating drill pipe sub electrically isolating said electrode section from adjacent drill pipe sections;
   a non-magnetic drill string section between said drill bit sub and said at least one drill pipe electrode section;
   a power supply connectable to said drill pipe electrode section to inject current into the earth surrounding said borehole and to produce a corresponding current flow in said target;
   a drill bit instrument at said drill bit sub and including first magnetic field sensors for detecting vector components of time-varying magnetic fields produced by said current flow in said target;
   communication electronics within said nonmagnetic drill pipe section; and
   telemetry for transmitting data corresponding to said vector components from said drill bit instrument to said communication electronics.

13. The apparatus of claim 12, wherein said drill string includes two electrically conductive drill pipe electrode sections spaced apart along the length of the drill string and electrically isolated from each other and from adjacent drill pipe sections by electrically insulating drill pipe subs, and wherein said power supply is connected to both of said electrically conductive drill pipe sections.

14. The apparatus of claim 13, wherein said power supply is located at the Earth's surface and is connected to said drill pipe electrode sections by a wireline insertable into said drill string, the wireline incorporating a power cable and two wireline electrodes, each wireline electrode being locatable within a corresponding drill pipe electrode section and connected through said power cable to said power supply;

wherein said wireline carries said communication electronics; and wherein said wireline incorporates a data cable connected to said communication electronics for transmitting data to surface instrumentation.

15. The apparatus of claim 13, wherein said power supply is located in said drill string and is connected to said drill pipe electrode sections;

the apparatus further including a measurement while drilling (MWD) instrument in said non-magnetic drill string section and connected to said communication electronics for transmitting data received by said communication electronics to instrumentation at the Earth's surface.

16. A method for deep well measurements in a borehole being drilled for determining the distance and direction from the borehole to a target, comprising:

locating a drill string in said borehole, the drill string having multiple drill pipe sections connected end-to-end and carrying at a distal end a directional drilling assembly and a drill bit sub;

providing at least one electrically conductive drill pipe electrode section in said drill string;

electrically isolating said electrode section from adjacent drill pipe sections;

energizing said drill pipe electrode section to inject a time-variable current into the earth surrounding said borehole and to produce a corresponding time-variable current flow in said target;

detecting vector components of time-varying magnetic fields produced by current flow in said target at a drill bit instrument at said drill bit sub;

transmitting data corresponding to said time-varying magnetic field to a communication instrument package located within a nonmagnetic drill pipe section located above said drive motor;

transmitting said data from said communication instrument package to surface instrumentation; and determining from said data the distance and direction from said drill bit sub to said target.

17. The method of claim 16, further including detecting vectors of the earth's magnetic field and gravity at said bit instrument to obtain Earth field perturbation data; and transmitting said Earth field perturbation data to said communication instrument package.

18. The method of claim 16, further including supplying said time-variable current to two spaced-apart drill stem electrodes to produce corresponding time-varying currents in the earth surrounding the borehole and in said target.

19. The method of claim 18, wherein supplying said time-variable current comprises supplying a transient pulsed current having a decay period to produce a corresponding decaying current having a decay period in said target, the decaying target current producing a corresponding characteristic decaying target magnetic field.

20. The method of claim 19, further including detecting vectors of said time-varying magnetic fields produced by current flow in said target during the decay period of said target current.

21. The method of claim 20, further including transmitting said vector data from said communication instrument package to a computer for determining the location of said target with respect to said drill bit sub.

22. The method of claim 16, further including resolving the sign ambiguity of detected magnetic fields.

* * * * *